Aug. 16, 1932.  E. O. SCHJOLIN  1,872,013
SIX-WHEEL VEHICLE
Filed Nov. 9, 1929  4 Sheets-Sheet 1
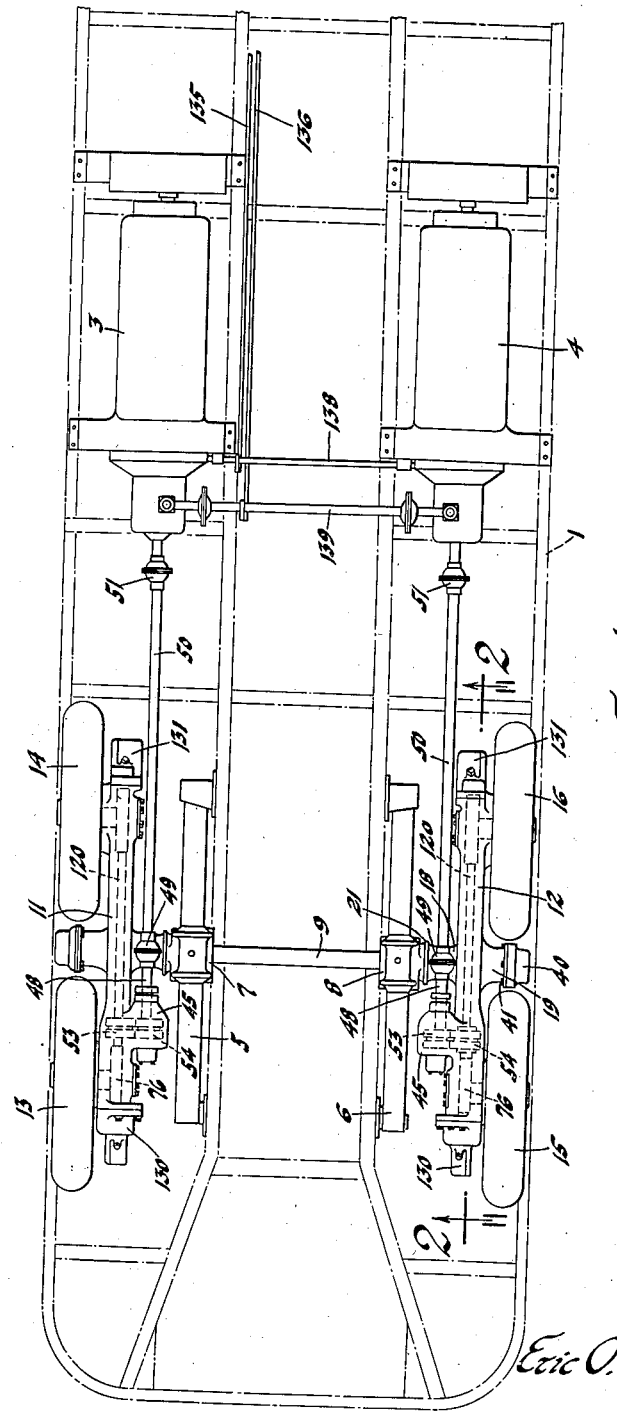

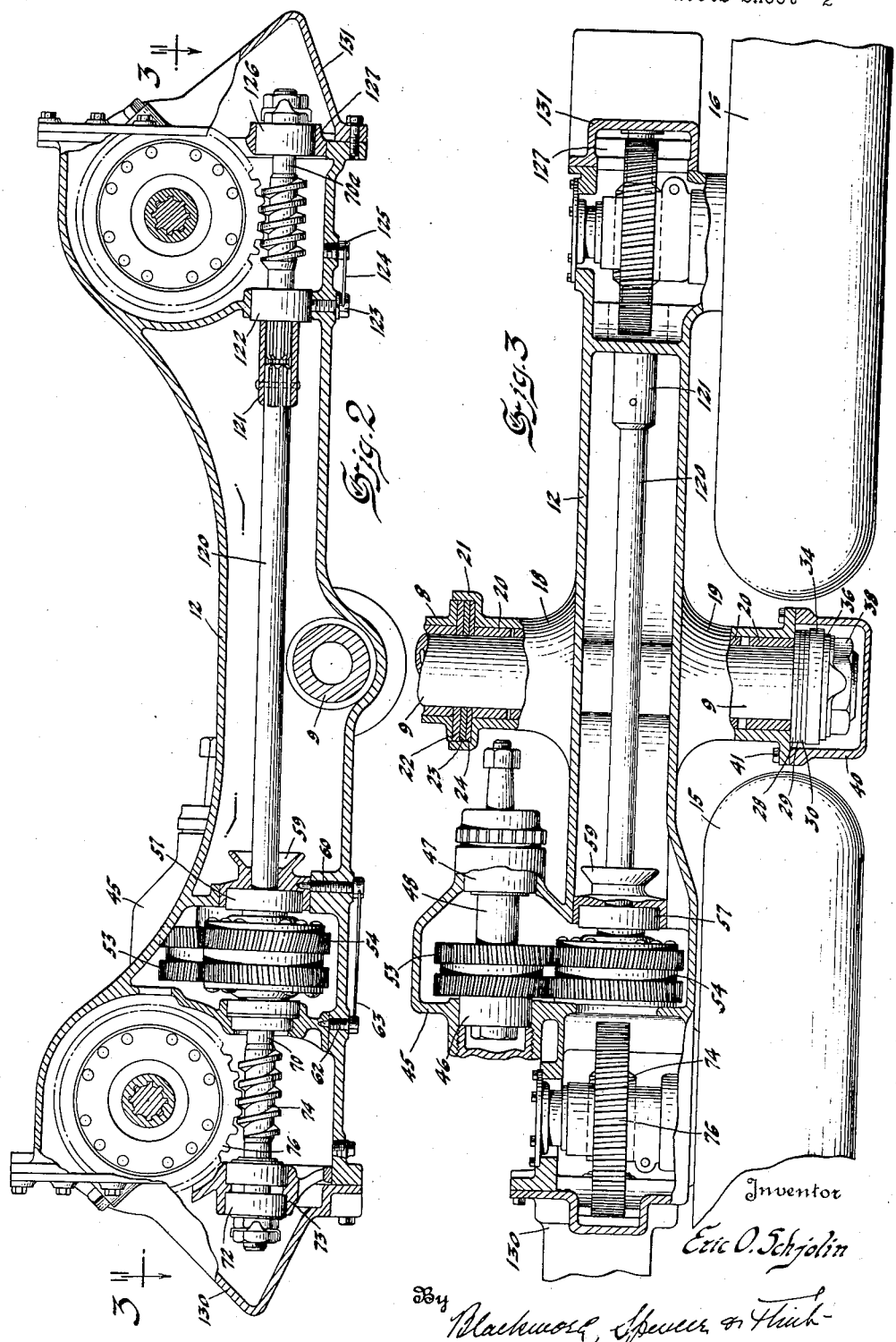

Aug. 16, 1932.         E. O. SCHJOLIN         1,872,013
SIX-WHEEL VEHICLE
Filed Nov. 9, 1929         4 Sheets-Sheet 3
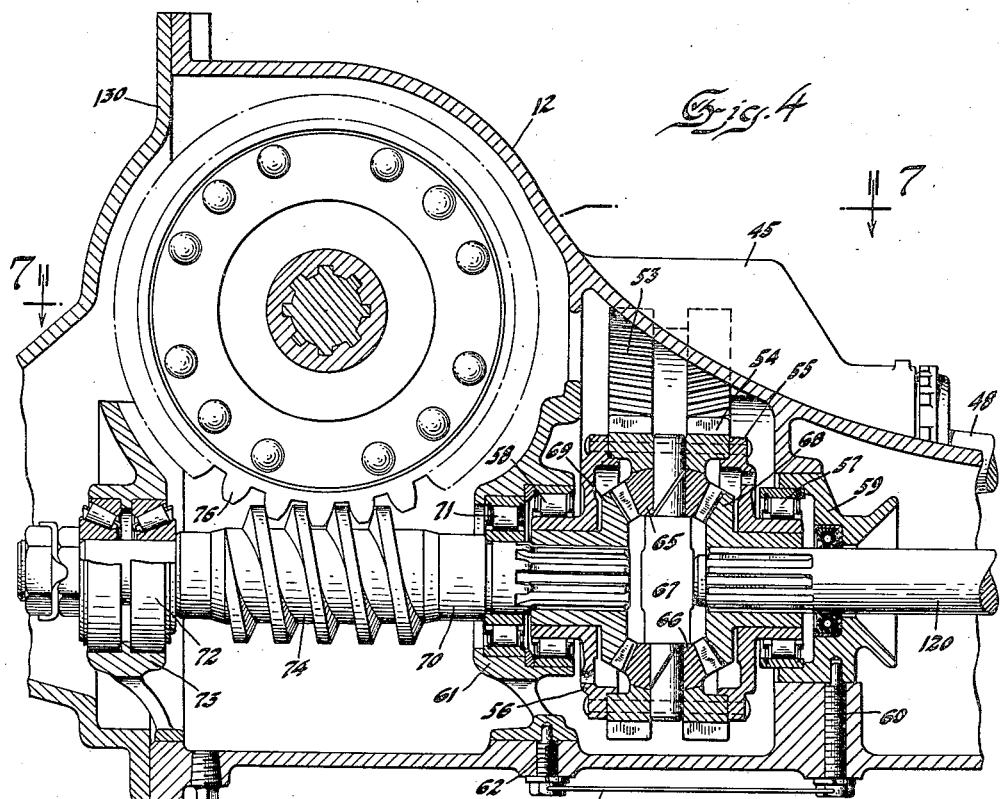
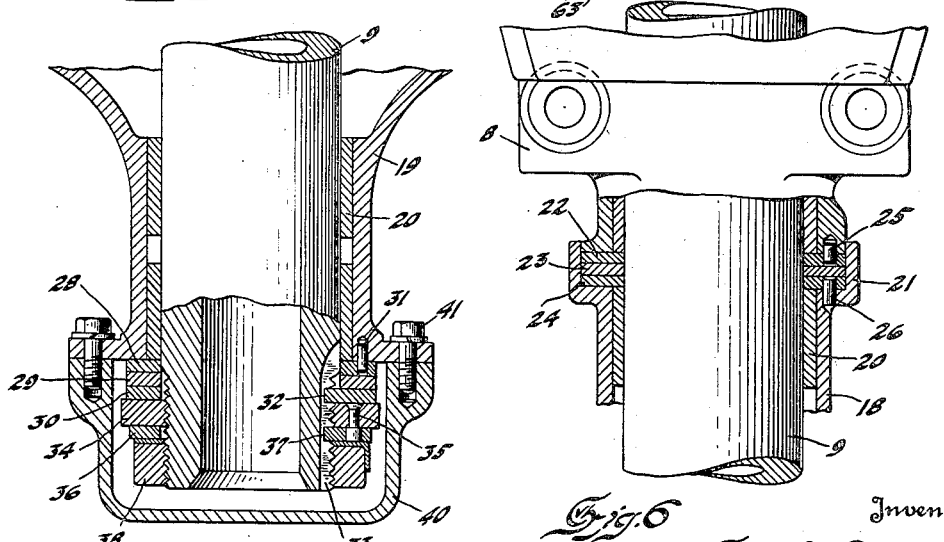
Inventor
Eric O. Schjolin
By Blackmore, Spencer & Flint
Attorneys Patented Aug. 16, 1932

1,872,013

UNITED STATES PATENT OFFICE

ERIC OLLE SCHJOLIN, OF PONTIAC, MICHIGAN, ASSIGNOR TO YELLOW TRUCK & COACH MANUFACTURING COMPANY, OF PONTIAC, MICHIGAN, A CORPORATION OF MAINE

SIX WHEEL VEHICLE

Application filed November 9, 1929. Serial No. 405,945.

This invention relates to motor vehicles and particularly to an improvement in running gear and contemplates the provision of two sets of traction units, one on each side of the vehicle and each including an equalizing beam carrying tandem wheels driven from an individual power plant.

The invention is particularly intended for heavy duty road vehicles such as passenger coaches and busses, as well as trucks, which require a great deal of power to operate and which must not only have a relatively wide speed range and run sweet and smooth at all speeds, but also have a fast pick-up or quick acceleration. To satisfy these requirements, is one of the principal objects of the present proposal to use two separate and independent power devices each driving a set of traction wheels and arranged for conjoint or unisonal operation to propel the vehicle.

To secure maximum traction surface, minimum wear and tear on the parts, less concentration and, therefore, better distribution of the load on the surface of the highway, so as to reduce wear on the road and allow increased loading, are among other objects of the invention, and these things are accomplished, in the present case, by the provision on both sides of the vehicle of a set of tandem wheels carried by an equalizing beam or lever member, the two members being pivoted for independent swinging movement preferably on opposite ends of a dead axle which supports the vehicle body through suitable springs.

A further object of the invention is to provide an equalizing hollow beam which will afford an inclosure or housing for the operating mechanism that transmits motion to the associated set of wheels from the individual power plants.

An additional object of the invention is to provide mechanism for dividing the power differentially between tandem wheels.

Another object is to provide a structure which reduces the angularity of interconnected propeller shaft sections and permits the use of relatively short shaft sections and, therefore, the positioning of the engine close to the traction wheel unit.

A still further object of the invention is to provide an axle unit so designed that various similar parts are interchangeable one with another, whereby the number of parts is materially reduced, making for economy and convenience in manufacture and assembly, facilitating subsequent service after the vehicle has been in use, and making it unnecessary for the service station operator to invest heavily in a large number of replacement parts.

Various other objects and features of advantage will be apparent from the following detailed specification of a preferred embodiment of the invention as illustrated in the accompanying drawings.

In the drawings:

Figure 1 is a fragmentary top plan view of a portion of a vehicle in which is embodied the subject matter hereof.

Figure 2 is a vertical sectional view taken on line 2—2 of Figure 1, showing one of the hollow equalizing beams and the mechanism inclosed thereby.

Figure 3 is a sectional view taken on line 3—3 of Figure 2.

Figure 4 is an enlarged detail view corresponding to the rear portion of the mechanism shown in Figure 2.

Figures 5 and 6 are detail sectional views of the pivotal mounting of the equalizing beam on the dead axle.

Figure 7:
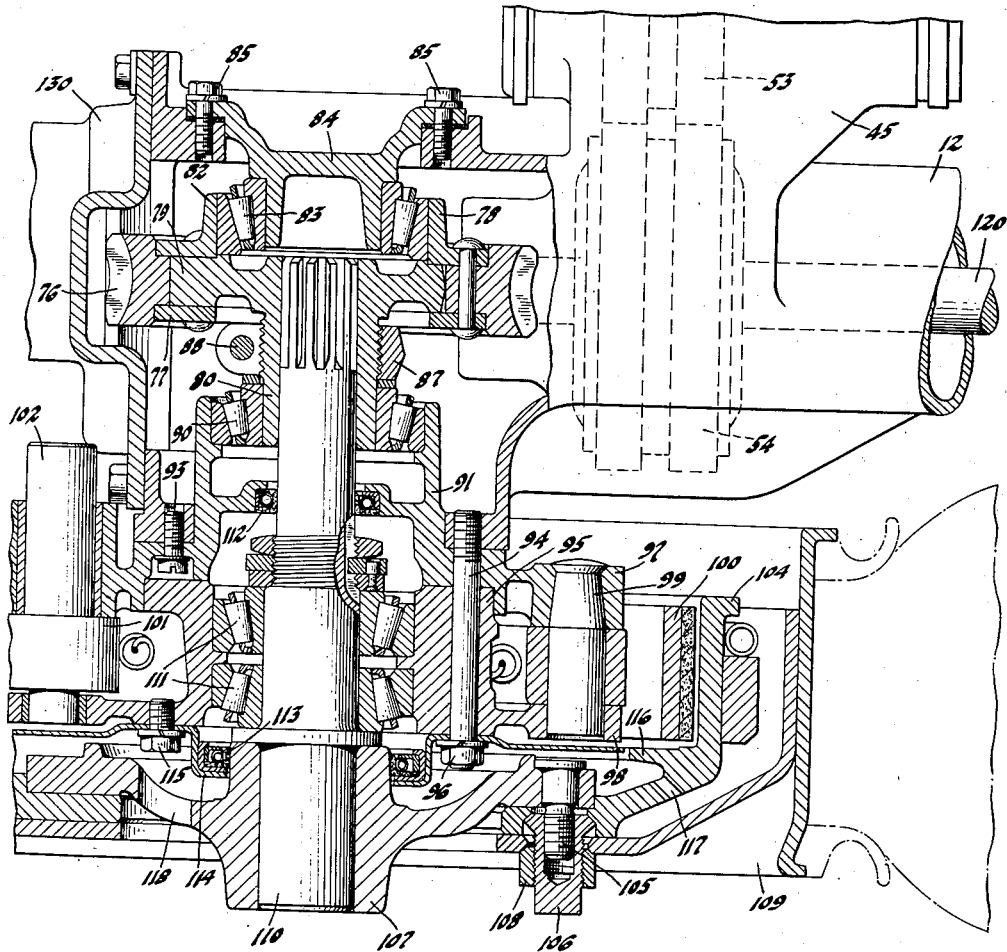
Figure 7 is a section taken on line 7—7 of Figure 4.

Referring to the accompanying drawings, the reference character 1 indicates the body framing of the motor vehicle, at a midlength portion of which and on opposite sides, are mounted the power plants or engines 3 and 4 respectively. These power plants may be of any suitable type, but are preferably the conventional internal combustion engines having the ordinary clutch and change speed gear mechanisms. The frame is shown as being flexibly supported on a pair of semi-elliptical springs 5 and 6 suitably shackled at opposite ends to the frame and secured at an intermediate point on spring pads or seats 7 and 8, respectively, fixed on a dead axle 9 extending transversely of the vehicle. Pivoted at an intermediate point on opposite ends of the dead axle 9 are the equalizing beams 11 and 12, respectively, the beam 11 carrying at opposite ends the longitudinally spaced road wheels 13—14 adapted to be driven by the engine 3, and the beam 12 carrying the tandem wheels 15 and 16, driven by the engine 4 as in the manner later to be described.

Except for the fact that the rocking beams 11 and 12 are made for the right and left hand sides of the vehicle, they are structurally the same, and, therefore, it will only be necessary to specifically refer to one of them and the beam 12 will now be described.

Referring first to the pivotal mounting of the beam on the dead axle, it will be noted from Figure 3 that the intermediate portion of the beam is provided with inner and outer hollow bosses or projections 18 and 19, respectively, preferably formed integral with the beam and received by the dead axle, with suitable bearing liners or bushings 20 therebetween. The innermost end of the projection 18 is provided with an outturned and inturned flange portion 21 forming a recess to receive a series of three thrust rings 22, 23 and 24. As shown in the drawings, the ring 22 may be fixed, as by one or more pins 25 to the spring pad 8 and the ring 24 is secured by the pin 26 to the flanged end 21 of the projection 18, while the intermediate ring 23 floats between the rings 22 and 24 whereby a relatively large area of bearing surface is provided by the contacting faces of the three rings, to take side thrust. A similar set of thrust rings 28, 29 and 30 are provided at the outer end of the projection 19, the ring 28 being secured by the pin 31 to the projection 19, the ring 29 being floating and the ring 30 having an inwardly extending tongue 32 that projects into an axial groove 33 in the outer end of the dead axle 9, to secure it in fixed relation with the axle. The rings are held in assembled relation by a suitable nut 34 threaded on the end of the dead axle 9 and having a rivet 35 therein, the head of which is adapted to be projected through any one of a number of apertures formed in a locking ring 36 that has an inwardly extending tongue 37 projecting into the axial groove 33. The nut 34 in addition to holding the parts in assembled relation, also permits adjustment to compensate for wear in the two sets of thrust rings. Another nut 38 threaded on the end of the axle holds the ring 36 in place and supplements the nut 34 in maintaining the rocking beam in position. To afford a finished appearance to the mounting and to preclude the accumulation of dirt and the like on the bearing members, a cover cap 40 may be positioned over the parts, and secured as by fastening bolts 41 to the projection 19.

On the inside of the housing and rearward of the axis of turning movement is formed a lateral extension 45 which carries in suitable bearing 46 and 47 a shaft section 48 projecting forwardly from the housing and secured by a universal joint 49 to one end of a propeller or drive shaft 50 which in turn is connected by the universal joint 51 to an engine shaft projecting rearwardly from the transmission housing of the engine 4. It will be noted that with the extension 45 rearward of the dead axle, the universal joint 49 is brought directly over and closely adjacent the dead axle thereby minimizing the angular movements of the shaft sections 48 and 50, permitting the use of a relatively short propeller shaft and the mounting of the engine closely adjacent to the rear wheels. By this arrangement, losses in power are kept low and the bulk of the engine weight is carried by the rear wheels.

On the shaft section 48 is a drive gear 53, shown as of the herringbone type, which is in mesh with the ring gear 54 of the differential mechanism that is shown in detail in Figure 4. The ring gear 54 is carried by a pair of side plate members 55 and 56 secured on opposite sides thereof as by rivets or the like, the hubs of which are mounted on antifriction bearings 57 and 58 respectively. A collar 59 secured in a web or wall of the housing 12 by a set screw 60, carries the bearing 57 while the bearing 58 is carried by a wall or web 61, secured in the casing by set screw 62, the two set screws 60 and 62 being secured together by the usual locking wire 63 to prevent their accidental removal. Differential gears 65 and 66 carried by a pin 67 in the ring gear 54, engage with the pinions 68 and 69 to divide the driving effort between the two wheels. The hub of the gear 69, which has a bearing in the side member 56, is splined on the end of a shaft 70, carrying a worm 74 and which is mounted at one end in bearings 71 carried by the support 61, and at the opposite end in bearings 72 carried by a removable wall 73.

This worm 74 has driving engagement with the worm gear or ring 76, secured between a pair of plates 77 and 78 (see Fig. 7) carried on the annular flange 79 of a hub 80. The ring 78 is provided with an annular flange 82 which is rotatably carried on the antifriction bearing 83 supported by an extension of the cover or plate 84, removably secured by studs 85 over an opening in the casing 12. Screw threaded on the hub 80 is a split nut 87, which may be contracted and locked in its adjusted position by a suitable stud 88, to bear against one end of the inner race of a bearing 90, the outer race of which is mounted in a support or ring 91. This member 91 is secured to the casing 12 by a series of screws or studs, one of which is shown at 93, and another of which is shown at 94; the longer stud 94 and the nut 96 thereon being adapted also to secure to the casing a mounting ring or support 95. Corresponding arms 97 and 98 on the members 91 and 95 respectively, carry a pivot pin 99 on which is mounted, between the arms, an inward extension of the brake shoe 100, forming one of a pair of internal expanding shoes. These shoes are spread apart by a suitable cam 101 carried on an operating shaft 102, also mounted on the members 91 and 95 as will be readily understood. The particular brake mechanism not forming any part of the present invention will not be further described.

The brake drum 104 is secured by a series of studs 105 and sleeve nuts 106, to an annular wheel flange of a hub 107. A nut 108 threaded on the sleeve nut 106 serves to detachably secure in position a disc wheel 109 for carrying the tire. This wheel hub 107 is shrunk or otherwise secured on the outer end of an axle 110, the inner end of which has splined engagement with the gear hub 80, and an intermediate portion of which is rotatably secured in suitable bearings 111 carried by the support 95. As a precaution against the leakage of lubricant from the casing, a sealing gasket 112 is carried by the support member 91 in contact with the periphery of the wheel shaft 110, and a similar packing element 113 is secured in hugging contact with the hub of the wheel by a sheet metal stamping 114 fastened by the stud 94 and studs 115 to the support 95. This stamping or plate 114 cooperates with an inturned ear or flange 116 formed on the brake drum, to deflect any grease leaking past the sealing gaskets into a trough formed by the flange 116 from whence it may be thrown out by centrifugal force during wheel rotation, through the openings 117, so as to prevent excess grease reaching the friction surfaces of the brake mechanism.

For convenience of assembly and disassembly the hub flange of the wheel is provided with one or more openings 118, so arranged as to permit the insertion of a wrench or other tool for engagement with the fastening nuts 96. Upon removal of these nuts, the wheel and its associated parts, including its axle shaft 110 and support 95 may be pulled away from the remainder of the structures. Such removal is made possible by the fact that the axle and driving gear hub 80 are splined together and the shafts 99 and 102 have a sliding fit with their supporting portions of the member 95.

Extending longitudinally through the casing 12 is a shaft 120 having splined engagement at one end with the pinion gear 68 and having secured at its opposite end a coupling sleeve 121 keyed or splined with a worm shaft 70a. One end of the worm shaft is journalled in the bearing 122 secured in a wall of the casing by a set screw 123 which is held against accidental unthreading by a locking wire 124 tied to the drain plug 125, while the opposite end of the worm shaft is journalled in the bearing 126 carried by a removable wall 127. The worm shaft 70a is similar to the shaft 70, before referred to, and the remainder of the wheel structure is substantially the same as that heretofore described. It will be apparent, therefore, that the structure of all four wheels of the traction unit are interchangeable one with the other, and that the differential mechanism, shaft 120, propeller shaft sections and power plants of the two traction units are also interchangeable. Because of this, costs of manufacture and handling are materially reduced and the duplication and standardization of many parts is possible.

Closing the front and rear ends of the hollow equalizer beam are the removable cover plates 130 and 131, respectively, the removal of which permits the easy assembly of the drive mechanism within the hollow beam through the open ends.

It will be understood that the two engines are under control of the operator and in order that each engine will take care of its share of the load the control elements for the two engines are so interconnected that the engines will operate in unison and give approximately the same output of power. One arrangement for unison control of the two power plants is shown in part in the plan view, Figure 1, wherein the reference characters 135 and 136 indicate a pair of tie rods extending rearwardly from a point adjacent the driver's seat. The rod 135 is connected with a rock shaft 138 to operate the clutch throw-out mechanisms of the two engines while the rod 136 is connected in a suitable fashion to the transverse shaft 139 which is both axially and rockably movable to bring about the proper engagement and disengagement of the elements of the two gear sets.

Obviously other types of power plants may be employed. In the event the wheels are driven by an electric motor, as would be the case in a gas-electric job, it may be desirable to mount the motor at the back end of the chassis and rearward of the traction wheels. In that event the axle unit is simply rotated 180° so that the propeller shafts extend rearwardly, this arrangement being permissible even though the propeller shaft sections may be relatively short in length because of the small angular movement of the shaft sections with the universal joint postioned closely to the axis of rocking movement.

While the above description has been more or less specific, it will be understood that the invention is not to be limited to the exact details shown. Various modifications may be made as will be apparent to those skilled in the art.

I claim:

1. In a motor vehicle, a dead axle, lever members pivoted at an intermediate point on opposite ends of the axle for independent swinging movement, a wheel mounted on each end of each member forming thereby two sets of tandem wheels, individual driving engines for the respective sets, operative connections between each set of wheels and its associated engine, including a sectional drive shaft, and a universal joint between sections of said shaft located adjacent the axis of swinging movement of the lever members.

2. In a motor vehicle, a dead axle, a wheel carrier pivoted intermediate its ends on said axle, a pair of wheels mounted on opposite ends of said carrier in tandem relation, an operating connection between the wheels, motion transmitting means located on one side of the dead axle and having driving engagement with said connection, a power plant located on the other side of the axle and having a propeller shaft extending toward the motion transmitting means, and a universal joint between said means and the propeller shaft positioned directly adjacent the axis of pivotal movement of said carrier.

3. In a motor vehicle, a dead axle, a casing pivoted intermediate its ends on the axle for swinging movement, wheel axles revolubly mounted in opposite ends of the casing, a sectional drive shaft having its endmost sections operatively connected with the respective wheel axles, means to connect one of the end sections with an intermediate section, differential mechanism connecting the other end section with an intermediate section, and a driving shaft revolubly mounted in a lateral extension of the casing and having a portion in driving engagement with said differential mechanism.

4. A road vehicle including a body, a pair of rock levers extending longitudinally of the body, one at each side thereof, fulcrum means on which the levers are pivoted on a transverse axis intermediate their ends, a load supporting flexible element between said means and the body, road wheels rotatably mounted at the ends of the rockers in tandem relation to equalize the load therebetween, an individual driving engine for the wheels associated with each rocker, said engines being mounted on the body and having flexible driving connections with their respective sets of wheels to accommodate movement permitted by said flexible element between the body and the lever fulcrum means.

5. A road vehicle including a body, a pair of rock levers extending longitudinally of the body, one at each side thereof, fulcrum means on which the levers are pivoted on a transverse axis intermediate their ends, a load supporting flexible element between said means and the body, road wheels rotatably mounted at the ends of the rockers in tandem relation to equalize the load therebetween, differential mechanism between the wheels on each rocker, and a pair of motors mounted on the body and individually coupled with the respective differential mechanisms.

6. A road vehicle including a frame, a pair of power plants mounted on the frame, an axle, spring means interposed between the axle and frame to flexibly support the frame on the axle for relative vertical movement, rockers pivotally mounted on the axle, one at each end thereof, a set of tandem road wheels rotatably mounted on each rocker, differential driving mechanism between the wheels of each set, and an individual drive between one of said power plants and the differential mechanism of one set of wheels and a similar drive between the other power plant and the differential mechanism of the other set of wheels.

7. A road vehicle including a frame, a pair of power plants mounted on the frame, an axle, spring means interposed between the axle and frame to flexibly support the frame on the axle for relative vertical movement, rockers pivotally mounted on the axle, one at each end thereof, a set of tandem road wheels rotatably mounted on each rocker, differential driving mechanism between the wheels of each set, and an individual drive between one of said power plants and the differential mechanism of one set of wheels and a similar drive between the other power plant and the differential mechanism of the other set of wheels, each of said drives including a flexible coupling to accommodate relative motion between the axle and frame.

8. A road vehicle including a pair of longitudinally extending hollow housings spaced transversely of each other and each having a lateral extension and being pivoted to the vehicle for rocking movement on a transverse axis intermediate its ends, a pair of road wheels mounted on each housing in tandem relation and on opposite sides of the pivotal axis, an individual driving motor for each set of wheels and power transmitting mechanism between each motor and the wheels to be driven thereby, including a sectional shaft enclosed within said housing with the sections associated respectively with a wheel to be driven, a shaft mounted in said housing extension in substantial parallelism with said sectional shaft and drive means between the sectional shaft and the other shaft which includes differential mechanism between the shaft sections associated with the respective wheels.

9. The structure of claim 8 wherein the housing extension and motor are positioned on opposite sides of the axis of rocking movement and in longitudinal spaced relation, and the motor and the shaft mounted in said extension are coupled by a propeller drive shaft with a universal joint between the two shafts which is positioned closely adjacent the axis of rocking movement to minimize relative angular movement of the shafts between the limits of rocking movement.

10. In a road vehicle, a dead axle, a spring mounted frame on the axle, a hollow walking beam rockably mounted on each end of the dead axle, a set of wheels arranged in tandem and rotatably mounted on each walking beam on opposite sides of the dead axle, individual driving mechanism for each set of wheels including means enclosed within the hollow walking beam to differentially drive associated wheels, and a separate power plant for each set of tandem wheels, mounted on the frame in longitudinal spaced relation to the dead axle.

11. In a motor vehicle, a cross-member, a hollow equalizing beam journaled on each end of said cross-member, wheels journaled on the ends of said equalizing beam, and means mounted inside of each equalizing beam for differentially driving the wheels thereon, said means comprising a sectional drive shaft journaled in said beam and extending endwise thereof, driving connections between said sections and the respective wheels on said beam, a single differential gear unit journaled in said beam intermediate the ends thereof and connecting the adjacent ends of the shaft sections therein, and a shaft journaled in said beam parallel to said sectional drive shaft and having a driving connection with said differential gear unit.

12. In a motor vehicle, a cross-member, a hollow equalizing beam journaled intermediate its ends on each end of said cross-member and having openings in its ends, caps for closing said openings, wheels journaled on each equalizing beam adjacent the ends thereof, and means mounted inside of each equalizing beam for differentially driving the wheels thereon, said means being adapted to be inserted in and removed from said equalizing beam through the openings in the ends thereof.

13. In a motor vehicle, a cross-member, hollow equalizing beams journaled on the ends of said cross-member, wheels journaled on the ends of said equalizing beams, means mounted in said equalizing beams for differentially driving the wheels thereon, and separate means mounted on said vehicle for independently driving the differential driving means in each beam, said separate means including a propeller shaft extending lengthwise of said beam and having a driving connection with the differential driving means therein.

14. In a motor vehicle, a cross-member, a hollow equalizing beam journaled intermediate its ends on each end of said cross-member and having openings in its ends, caps for closing said openings, a wheel journaled on each end of said equalizing beam, mechanism mounted in said equalizing beam for differentially driving the wheels thereon, a separate motor mounted on said vehicle for driving the driving mechanism of each equalizing beam, the driving connection between each motor and the driving mechanism of each beam including a shaft extending lengthwise of said beam and operatively engaging the differential driving mechanism therein.

15. In a motor vehicle, a cross-member, a hollow equalizing beam journaled on each end of said cross-member, a stub axle journaled in each end of said beam, a wheel secured to each stub axle, axially alined driving shaft sections journaled inside of each beam, differential gearing mounted inside of each beam and connecting the adjacent ends of the driving shaft sections therein, driving connections between said driving shaft sections and said stub axles, and separate means for driving the respective differential gearings.

16. In a motor vehicle, a cross-member, a hollow equalizing beam journaled on each end of said cross-member, a stub axle journaled in each end of said beam, a wheel fixed to each stub axle, axially alined intermediate and end driving shaft sections journaled inside of each beam, means for connecting the adjacent ends of said intermediate driving shaft section and one of said end driving shaft sections, differential gearing mounted inside of each beam and connecting the adjacent end of said intermediate driving shaft section and said other end driving shaft section, a worm gear on each stub axle inside each beam, and worms on the end driving shaft sections meshing with the worm gears on the respective stub axles.

17. In a motor vehicle, a cross-member, a hollow equalizing beam journaled on each end of said cross-member and having openings in its ends, caps for closing said openings, a stub axle journaled in each end of said beam opposite the opening therein, a wheel secured to the outer end of each stub axle, axially alined intermediate and end driving shaft sections journaled in each hollow beam, means in each hollow beam for connecting the adjacent ends of said intermediate section and one of said end sections, differential gearing in each rollow beam connectnecting the adjacent ends of said intermediate section and said other end section, a worm gear splined on the inner end of each stub axle, and worms on the end driving shaft sections meshing with the worm gears on the respective stub axles, said driving shaft section, worm gears and differential gearing being adapted to be inserted in and removed from said beam through the openings in the ends thereof.

18. In a motor vehicle, a cross member, a hollow equalizing beam journaled on each end of said cross-member, a wheel journaled on each end of said equalizing beam, axially alined driving shaft sections journaled in each beam and extending endwise thereof, driving connection between said sections and the respective wheels on the same side of the vehicle, differential gearing in each hollow beam connecting the adjacent ends of the shaft sections therein, and a pinion shaft at each side of the vehicle extending alongside of and in the general direction of one of said shaft sections and having a pinion meshing with said differential gearing to drive the same.

19. In a motor vehicle, a cross-member, a hollow equalizing beam journaled on each end of said cross-member and having openings in the ends thereof, caps for closing said openings, a wheel journaled on each end of said equalizing beam, axially alined intermediate and end driving shaft sections journaled in said beam, a driving connection between each end section and an adjacent wheel, means for supporting the outer ends of said end sections, means for connecting the adjacent ends of said intermediate section and one of said end sections, two pedestals in said beam in alinement with said shaft sections, and differential gearing journaled in said pedestals and connecting the adjacent ends of said intermediate section and the other end section, one of said pedestals being removable from said beam through the opening in the end thereof.

In testimony whereof I affix my signature.

ERIC OLLE SCHJOLIN.